US011774991B2

(12) United States Patent
Miyazaki et al.

(10) Patent No.: US 11,774,991 B2
(45) Date of Patent: Oct. 3, 2023

(54) INFORMATION PROCESSING APPARATUS, INFORMATION PROCESSING METHOD, AND COMPUTER PROGRAM PRODUCT FOR CONTROLLING VIBRATION

(71) Applicant: Sony Corporation, Tokyo (JP)

(72) Inventors: Shuhei Miyazaki, Tokyo (JP); Yugo Takeda, Tokyo (JP); Takeshi Matsui, Tokyo (JP); Taku Tomita, Tokyo (JP); Seiji Muramatsu, Tokyo (JP); Ryoko Amano, Tokyo (JP); Risa Takahashi, Tokyo (JP); Ikuo Yamano, Tokyo (JP); Takeshi Ogita, Tokyo (JP); Ayumi Kato, Tokyo (JP); Ryo Yokoyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 141 days.

(21) Appl. No.: 16/969,989

(22) PCT Filed: Dec. 26, 2018

(86) PCT No.: PCT/JP2018/047900
§ 371 (c)(1),
(2) Date: Aug. 14, 2020

(87) PCT Pub. No.: WO2019/163283
PCT Pub. Date: Aug. 29, 2019

(65) Prior Publication Data
US 2020/0401164 A1 Dec. 24, 2020

(30) Foreign Application Priority Data
Feb. 23, 2018 (JP) ................. 2018-031278

(51) Int. Cl.
G06F 3/16 (2006.01)
G06F 3/01 (2006.01)
(Continued)

(52) U.S. Cl.
CPC ........... *G05D 19/02* (2013.01); *B06B 1/0207* (2013.01); *G06F 3/016* (2013.01); *G06F 3/16* (2013.01)

(58) Field of Classification Search
CPC . G06F 3/016; G06F 3/16; G06F 3/162; G06F 3/165; G06F 3/167; G05D 19/00;
(Continued)

(56) References Cited

U.S. PATENT DOCUMENTS

2005/0275508 A1 12/2005 Orr
2012/0256858 A1* 10/2012 Sudo ...................... G06F 3/016
345/173
(Continued)

FOREIGN PATENT DOCUMENTS

EP 2911376 A1 8/2015
JP 2012-221179 A 11/2012
(Continued)

OTHER PUBLICATIONS

International Search Report and Written Opinion dated Mar. 26, 2019 for PCT/JP2018/047900 filed on Dec. 26, 2018, 9 pages including English Translation of the International Search Report.

Primary Examiner — Reza Nabi
Assistant Examiner — Hwei-Min Lu
(74) Attorney, Agent, or Firm — XSENSUS LLP

(57) ABSTRACT

An information processing apparatus capable of controlling vibration in accordance with a situation in a case where the vibration is generated on the basis of an audio signal. The information processing apparatus can include: a vibrator; and a controller configured to detect a state of the information processing apparatus and control a state of the vibrator based on a detection result, in which the controller controls vibration the vibrator in accordance with reproduction of content while the content is being reproduced in the infor-
(Continued)

mation processing apparatus, and, in a case where a predetermined condition is satisfied, restricts vibration of the vibrator even while the content is being reproduced in the information processing apparatus.

17 Claims, 5 Drawing Sheets

(51) Int. Cl.
*G05D 19/02* (2006.01)
*B06B 1/02* (2006.01)

(58) Field of Classification Search
CPC .. G05D 19/02; B06B 1/00; B06B 1/02; B06B 1/0207
USPC .......................................................... 715/702
See application file for complete search history.

(56) References Cited

U.S. PATENT DOCUMENTS

| | | | | |
|---|---|---|---|---|
| 2013/0065648 A1* | 3/2013 | Kim | ................. | G06F 21/32 455/566 |
| 2013/0223631 A1* | 8/2013 | Greuet | ................. | H04R 1/403 381/74 |
| 2014/0217828 A1* | 8/2014 | Tanaka | ................. | H02J 7/00712 307/104 |
| 2015/0209668 A1* | 7/2015 | Obana | ................. | G06F 3/016 463/31 |
| 2015/0303732 A1* | 10/2015 | Dow | ................. | H02J 50/10 320/108 |
| 2015/0348379 A1 | 12/2015 | Moussette | | |
| 2016/0180879 A1 | 6/2016 | Ullrich et al. | | |
| 2016/0374049 A1 | 12/2016 | Ha | | |
| 2017/0036108 A1* | 2/2017 | Sakata | ................. | G06F 3/0338 |
| 2017/0136354 A1* | 5/2017 | Yamano | ................. | G06F 1/1632 |
| 2017/0285848 A1* | 10/2017 | Rosenberg | ................. | G06F 3/04883 |
| 2018/0035208 A1 | 2/2018 | Choi | | |
| 2018/0213113 A1* | 7/2018 | Takano | ................. | G06F 3/0483 |
| 2018/0364040 A1* | 12/2018 | Seo | ................. | G01C 5/06 |

FOREIGN PATENT DOCUMENTS

| | | | | |
|---|---|---|---|---|
| JP | 2015-007836 A | | 1/2015 | |
| JP | 2015007836 A | * | 1/2015 | ........... A63F 13/214 |
| JP | 2015-231098 A | | 12/2015 | |
| JP | 2016-005311 A | | 1/2016 | |
| JP | 2016-119071 A | | 6/2016 | |
| KR | 1031113 B1 | * | 4/2011 | |
| WO | WO-2015186394 A1 | * | 12/2015 | ........... A63F 13/214 |

\* cited by examiner

INFORMATION PROCESSING APPARATUS, INFORMATION PROCESSING METHOD, AND COMPUTER PROGRAM PRODUCT FOR CONTROLLING VIBRATION

CROSS-REFERENCE TO RELATED APPLICATIONS

The present application is based on PCT filing PCT/JP2018/047900, filed Dec. 26, 2018, which claims priority to JP 2018-031278, filed Feb. 23, 2018, the entire contents of each are incorporated herein by reference.

TECHNICAL FIELD

The present disclosure relates to an information processing apparatus, an information processing method, and a computer program.

BACKGROUND ART

Conventionally, various apparatuses for reproducing, for example, content such as music and images have been developed. Further, there have been proposed various technologies of generating vibration, emitting light, and driving devices on the basis of a control signal from the outside. For example, Patent Document 1 cited below discloses a technology of, in a case where a vibration device acquires an audio signal from an electronic device, generating vibration on the basis of the acquired audio signal.

CITATION LIST

Patent Document

Patent Document 1: Japanese Patent Application Laid-Open No. 2015-231098

SUMMARY OF THE INVENTION

Problems to be Solved by the Invention

In a case where an electronic device includes a vibration device and the vibration device generates vibration on the basis of a signal, it is desirable to control the vibration of the vibration device in accordance with a state of the electronic device, such as whether or not screen display is performed.

Therefore, the present disclosure proposes a new and improved information processing apparatus, information processing method, and computer program, each of which is capable of controlling vibration in accordance with a situation in a case where the vibration is generated on the basis of an audio signal.

Solutions to Problems

The present disclosure provides an information processing apparatus including: a vibration unit; and a control unit configured to detect a state of the own apparatus and control a state of the vibration unit on the basis of a detection result, in which the control unit vibrates the vibration unit in accordance with reproduction of content while the content is being reproduced in the own apparatus, and, in a case where a predetermined condition is satisfied, restricts vibration of the vibration unit even while the content is being reproduced in the own apparatus.

Further, the present disclosure provides an information processing method including: detecting a state of an own apparatus and controlling a state of a vibration unit on the basis of a detection result; and vibrating the vibration unit in accordance with reproduction of content while the content is being reproduced in the own apparatus, and, in a case where a predetermined condition is satisfied, restricting vibration of the vibration unit even while the content is being reproduced in the own apparatus.

Further, the present disclosure provides a computer program for causing a computer to execute: detecting a state of an own apparatus and controlling a state of a vibration unit on the basis of a detection result; and vibrating the vibration unit in accordance with reproduction of content while the content is being reproduced in the own apparatus, and, in a case where a predetermined condition is satisfied, restricting vibration of the vibration unit even while the content is being reproduced in the own apparatus.

Effects of the Invention

As described above, the present disclosure can provide a new and improved information processing apparatus, information processing method, and computer program, each of which is capable of controlling vibration in accordance with a situation in a case where the vibration is generated on the basis of an audio signal.

Note that the above effects are not necessarily limited, and any of the effects described in the present specification or other effects that can be grasped from the present specification may be exhibited in addition to or in place of the above effects.

MODE FOR CARRYING OUT THE INVENTION

Hereinafter, preferred embodiments of the present disclosure will be described in detail with reference to the accompanying drawings. Note that, in this specification and the drawings, components having substantially the same functional configurations will be represented as the same reference signs, and repeated description thereof will be omitted.

Note that description will be provided in the following order.

1. Embodiment of present disclosure
1.1. Configuration example
1.2. Operation example
2. Conclusion

1. EMBODIMENT OF PRESENT DISCLOSURE

1.1. Configuration Example

Figure 1:
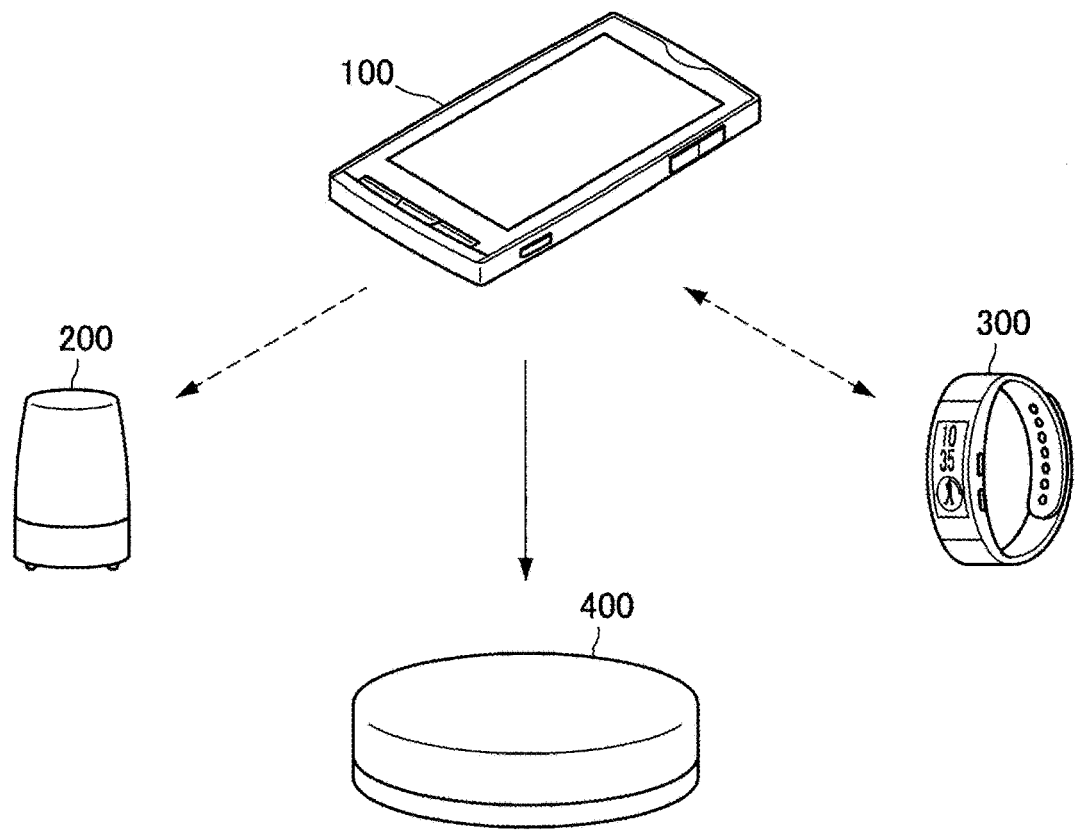
FIG. 1 is an explanatory diagram illustrating a configuration example of an information processing system according to an embodiment of the present disclosure.

First, a configuration example of an information processing system according to an embodiment of the present disclosure will be described. FIG. 1 is an explanatory diagram illustrating the configuration example of the information processing system according to the embodiment of the present disclosure. Hereinafter, the configuration example of the information processing system according to the embodiment of the present disclosure will be described with reference to FIG. 1.

As illustrated in FIG. 1, the information processing system according to the embodiment of the present disclosure includes an information processing apparatus 100, a wireless speaker 200, a smartwatch 300, and a wireless charger 400.

The information processing apparatus 100 is, for example, a high-performance mobile phone such as a smartphone, a tablet terminal, a portable game console, a portable music player, or the like, and is an apparatus including a vibration device such as a vibrator in the apparatus. Although a functional configuration example of the information processing apparatus 100 will be described later, the information processing apparatus 100 has a function of vibrating the vibration device in accordance with output of sound on the basis of settings while the sound is being output.

The wireless speaker 200 is a speaker that receives an audio signal from the wirelessly-connected information processing apparatus 100 and outputs sound based on the audio signal. Wireless communication between the wireless speaker 200 and the information processing apparatus 100 is performed by, for example, a communication method using radio waves in a 2.4 GHz band and conforming to the IEEE 802.15.1 standard.

The smartwatch 300 is a wristwatch device having a wireless communication function. The smartwatch 300 can operate alone, and can also operate while transmitting and receiving signals to and from the wirelessly-connected information processing apparatus 100.

The wireless charger 400 is a charger that charges the information processing apparatus 100 without connecting metal contacts such as terminals and connectors. The wireless charger 400 includes a coil in the wireless charger 400, and a magnetic field generated by causing a current to flow through the coil passes through a coil of the information processing apparatus 100. Thus, a current flows through the information processing apparatus 100 because of electromagnetic induction. The current flowing through the information processing apparatus 100 is used for charging a battery inside the information processing apparatus 100. Therefore, the wireless charger 400 can charge the information processing apparatus 100 without depending on connection of the metal contacts.

Hereinabove, the configuration example of the information processing system according to the embodiment of the present disclosure has been described. Next, the functional configuration example of the information processing apparatus 100 according to the embodiment of the present disclosure will be described.

Figure 2:
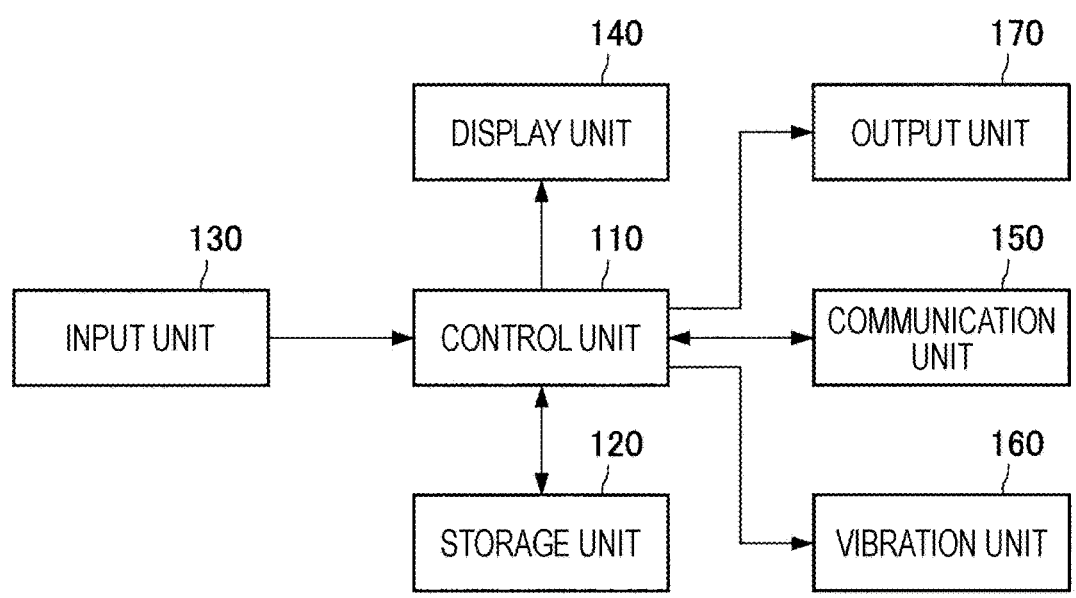
FIG. 2 is an explanatory diagram illustrating a functional configuration example of an information processing apparatus according to the embodiment.

FIG. 2 is an explanatory diagram illustrating the functional configuration example of the information processing apparatus 100 according to the embodiment of the present disclosure. Hereinafter, the functional configuration example of the information processing apparatus 100 according to the embodiment of the present disclosure will be described with reference to FIG. 2.

As illustrated in FIG. 2, the information processing apparatus 100 according to the embodiment of the present disclosure includes a control unit 110, a storage unit 120, an input unit 130, a display unit 140, a communication unit 150, a vibration unit 160, and an output unit 170.

The control unit 110 includes, for example, a processor such as a central processing unit (CPU), and controls operation of each unit of the information processing apparatus 100. The control unit 110 executes, for example, an application stored in the storage unit 120 to execute processing of reproducing content stored in the storage unit 120 or received from the communication unit 150 by streaming. Further, in this embodiment, the control unit 110 controls the vibration unit 160 to vibrate on the basis of settings while sound is being output from the output unit 170. Then, in a case where a state of the information processing apparatus 100 satisfies a vibration restriction condition of the vibration unit 160, the control unit 110 restricts vibration of the vibration unit 160.

For example, when, in a case where the output unit 170 outputs sound, a non-operation state of the information processing apparatus 100 continues for a predetermined time period and screen display by the display unit 140 is stopped (screen display is turned off) because of a sleep function that the information processing apparatus 100 has, the control unit 110 may determine that the vibration restriction condition is satisfied and restrict the vibration caused by the vibration unit 160. Note that the restriction of the vibration caused by the vibration unit 160 herein may be completely stopping the vibration caused by the vibration unit 160, or may be weakening the vibration caused by the vibration unit 160 as compared with a case where the vibration is not restricted.

Further, for example, the control unit 110 may control the vibration of the vibration unit 160 on the basis of content output to the display unit 140 or an application executed by the control unit 110 immediately before the screen display by the display unit 140 is turned off. For example, in a case where the control unit 110 executes a music reproduction application, the control unit 110 may continue to vibrate the vibration unit 160 in conjunction with reproduction of music even when the screen display by the display unit 140 is turned off.

Further, for example, in a case where the control unit 110 executes a moving image reproduction application, the control unit 110 may determine that the vibration restriction condition is satisfied when the screen display by the display unit 140 is turned off, and restrict the vibration caused by the vibration unit 160. Note that, in a case where the control unit 110 executes the moving image reproduction application and content reproduced by the moving image reproduction application is a music video, the control unit 110 may cause the moving image reproduction application to continue to reproduce sound (music) of the music video and continue to vibrate the vibration unit 160 in conjunction with the sound even when the screen display by the display unit 140 is turned off. Meanwhile, in a case where the control unit 110 executes the moving image reproduction application and content reproduced by the moving image reproduction application is video content such as a movie, the control unit 110 may determine that the vibration restriction condition is satisfied when the screen display by the display unit 140 is turned off, and restrict the vibration caused by the vibration unit 160. In this case, reproduction of the video content (video and sound) is stopped at a timing at which the screen display is turned off.

Further, for example, the control unit 110 may change behavior of the vibration caused by the vibration unit 160 in a case where the screen display by the display unit 140 is turned off in accordance with a file format of the content reproduced by the application.

Further, for example, the control unit 110 may determine the type of the content by music analysis, and change the behavior of the vibration caused by the vibration unit 160 on the basis of the determination result in a case where the screen display is turned off.

Further, for example, the control unit 110 may determine the type of the content by machine learning, and change the behavior of the vibration caused by the vibration unit 160 on the basis of the determination result in a case where the screen display is turned off.

Further, for example, the control unit 110 may control the vibration of the vibration unit 160 on the basis of sensing data output by sensors included in the input unit 130 described later. For example, when the control unit 110 detects that the information processing apparatus 100 is placed on a flat place such as a floor or a table for a predetermined time period or more on the basis of sensing data output from the sensors such as an acceleration sensor and a gyro sensor, the control unit 110 may determine that the vibration restriction condition is satisfied, and restrict the vibration caused by the vibration unit 160. In addition, as examples of the place, the control unit 110 may detect that the information processing apparatus 100 is placed on an uneven object such as a chair or that the information processing apparatus 100 is hung on a hook on the basis of sensing data.

Further, for example, in a case where the music reproduction application or the moving image reproduction application is being executed and sound output from the output unit 170 is stopped by user operation, the control unit 110 may determine that the vibration restriction condition is satisfied and restrict the vibration caused by the vibration unit 160.

When the vibration unit 160 vibrates while the information processing apparatus 100 is being placed on the wireless charger 400, the information processing apparatus 100 may unexpectedly move and may not be normally charged by the wireless charger 400. Therefore, in a case where sound is output from the output unit 170 and the control unit 110 detects that the information processing apparatus 100 is placed on the wireless charger 400, the control unit 110 may determine that the vibration restriction condition is satisfied, and restrict the vibration caused by the vibration unit 160 even if the screen display by the display unit 140 is on. The detection that the information processing apparatus 100 is placed on the wireless charger 400 may be performed by, for example, detecting strength of the magnetic field from the wireless charger 400. In this case, when the control unit 110 detects that the information processing apparatus 100 has been removed from the wireless charger 400, the control unit 110 may cancel the restriction of the vibration caused by the vibration unit 160.

Meanwhile, when the control unit 110 detects that the information processing apparatus 100 is placed on the wireless charger 400, the control unit 110 may control the vibration of the vibration unit 160 so that the information processing apparatus 100 is moved to a position where efficiency of wireless charging by the wireless charger 400 is improved. For example, in a case where the information processing apparatus 100 includes a plurality of vibrators, the information processing apparatus 100 placed on a flat surface can be moved in an arbitrary direction by changing a vibration pattern of each vibrator. Therefore, by repeatedly vibrating the vibration unit 160 and detecting the strength of the magnetic field from the wireless charger 400, the control unit 110 can move the information processing apparatus 100 to a position where the efficiency of wireless charging by the wireless charger 400 is improved.

As described above, in a state in which the control unit 110 restricts the vibration caused by the vibration unit 160, the control unit 110 may transmit data for vibrating another device connected to the information processing apparatus 100, for example, the smartwatch 300 from the communication unit 150. This makes it possible to vibrate another device connected to the information processing apparatus 100 in a state in which the control unit 110 restricts the vibration caused by the vibration unit 160.

The storage unit 120 includes, for example, storage devices such as a read only memory (ROM) and various random access memories (RAMs), and stores programs and various settings for operating the information processing apparatus 100, content to be displayed on the display unit 140, and the like. The content stored in the storage unit 120 may include content displayed on the display unit 140 as a stereoscopic image.

The input unit 130 includes, for example, input devices such as a touchscreen and a button, various sensors such as a ToF sensor, an acceleration sensor, a gyro sensor, a pressure sensor, and a position information sensor, an imaging device including a lens and an image sensor, and the like. The input unit 130 provides data acquired by the input device and the various sensors for the control unit 110.

The display unit 140 includes, for example, a thin display device such as a liquid crystal display and an organic EL display. Display of an image on the display unit 140 is controlled by the control unit 110.

The communication unit 150 performs communication with an external device. The communication unit 150 may include an interface for wired communication and an interface for wireless communication.

The vibration unit 160 vibrates under the control of the control unit 110. The vibration unit 160 includes, for example, an actuator such as an eccentric rotating mass motor (ERM) or a linear resonant actuator (LRA). The number of actuators may be one or more.

The output unit 170 includes a device that outputs predetermined information, and includes, for example, a speaker that outputs sound, a light-emitting diode that emits light, and the like.

Hereinabove, the functional configuration example of the information processing apparatus 100 according to the embodiment of the present disclosure has been described. Next, an operation example of the information processing apparatus 100 according to the embodiment of the present disclosure will be described.

1.2. Operation Example

Figure 3:
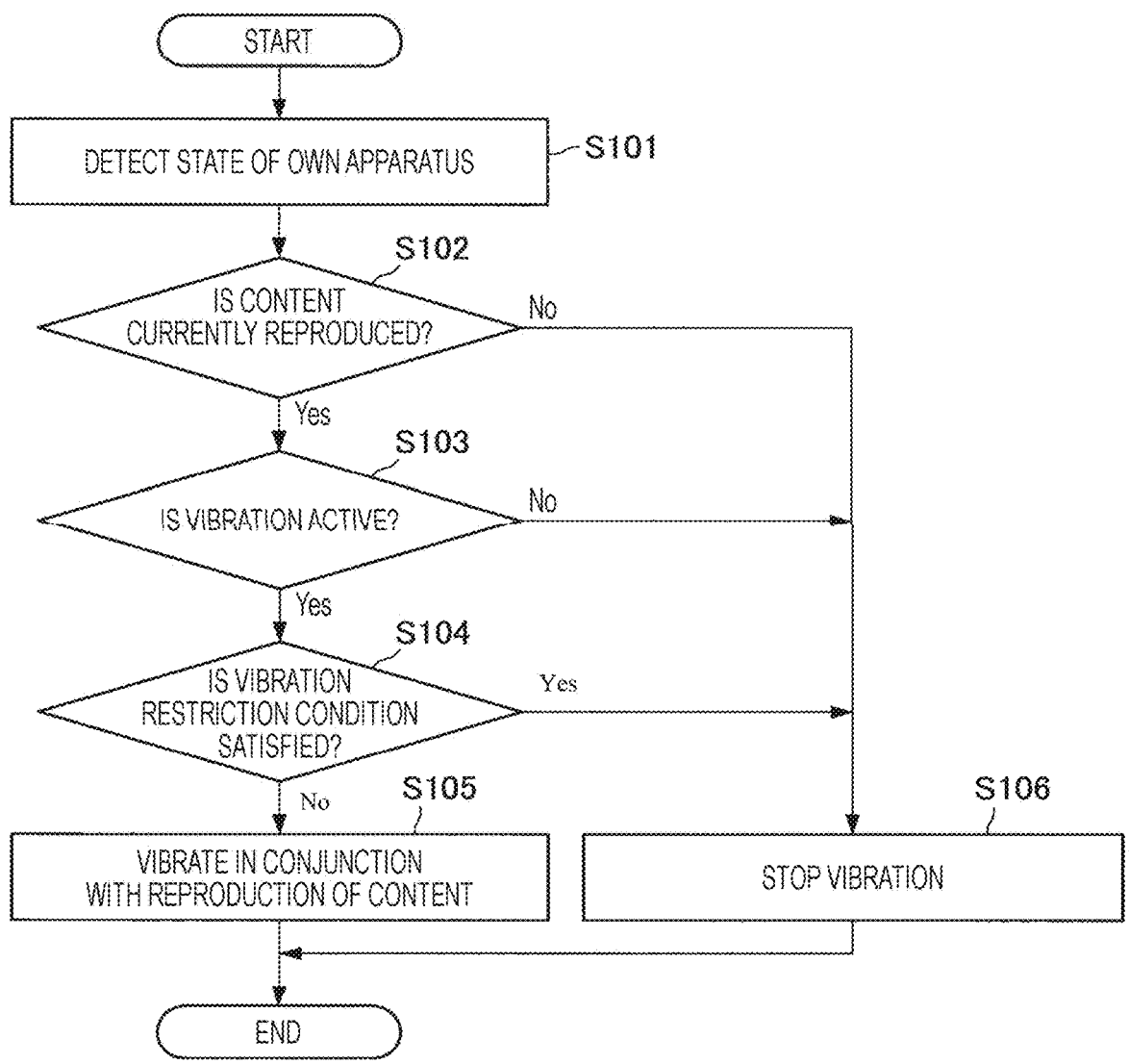
FIG. 3 is a flowchart showing an operation example of the information processing apparatus according to the embodiment.

FIG. 3 is a flowchart showing an operation example of the information processing apparatus 100 according to the embodiment of the present disclosure. FIG. 3 shows an operation example of the information processing apparatus 100 that vibrates the vibration unit 160 in accordance with output of sound while the sound is being output.

The information processing apparatus 100 first detects a state of the own apparatus (step S101). This detection processing in step S101 is executed by, for example, the control unit 110. Information obtained by this detection processing includes, for example, information about whether or not sound is output from the output unit 170, an application that is currently executed, details of content that is currently reproduced, a state of the information processing apparatus 100 based on sensing data transmitted from the input unit 130, settings of vibration of the vibration unit 160, information regarding a wirelessly-connected device, and the like.

When the information processing apparatus 100 detects the state of the own apparatus in step S101, the information processing apparatus 100 then determines whether or not content is currently reproduced in the own apparatus (step S102). This determination processing in step S102 is executed by, for example, the control unit 110.

In a case where the content is currently reproduced in the own apparatus as a result of the determination in step S102 (Yes in step S102), the information processing apparatus 100 then determines whether or not vibration caused by the vibration unit 160 is set to be active (step S103). This determination processing in step S103 is executed by, for example, the control unit 110.

In a case where the vibration caused by the vibration unit 160 is set to be active as a result of the determination in step S103 (Yes in step S103), the information processing apparatus 100 then determines whether or not the own apparatus satisfies the vibration restriction condition for restricting the vibration caused by the vibration unit 160 (step S104). This determination processing in step S104 is executed by, for example, the control unit 110. Examples of the vibration restriction condition have been described above. However, in the present disclosure, the vibration restriction condition is not limited to those examples.

Then, in a case where the vibration restriction condition is not satisfied as a result of the determination in step S104 (No in step S104), the information processing apparatus 100 vibrates the vibration unit 160 in accordance with reproduction of the content (step S105).

Meanwhile, in a case where the content is not currently reproduced in the own apparatus (No in step S102), in a case where the vibration caused by the vibration unit 160 is not set to be active (No in step S103), or in a case where the vibration restriction condition is satisfied (Yes in step S104), the information processing apparatus 100 restricts the vibration of the vibration unit 160 in step S106 (e.g., stops vibration).

By executing the above series of operation, the information processing apparatus 100 according to the embodiment of the present disclosure can control the vibration caused by the vibration unit 160 depending on a situation of the own apparatus.

Figure 4:
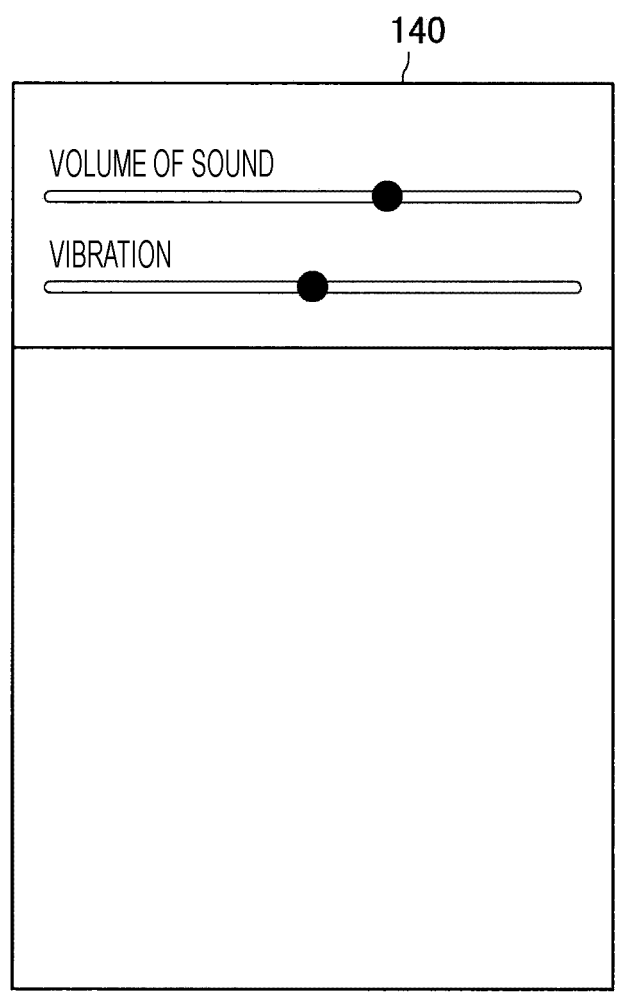
FIG. 4 is an explanatory diagram illustrating an example of a user interface displayed by an information processing apparatus.

Note that the information processing apparatus 100 according to the embodiment of the present disclosure can vibrate the vibration unit 160 in accordance with reproduction of the content, and may change magnitude of the vibration of the vibration unit 160 in conjunction with volume of sound or may independently set the volume of the sound and the magnitude of the vibration of the vibration unit 160. In a case where the volume of the sound and the magnitude of the vibration of the vibration unit 160 are independently set, the information processing apparatus 100 may display, for example, a user interface illustrated in FIG. 4 on the display unit 140 to allow the user to set the volume of the sound and the magnitude of the vibration of the vibration unit 160. The user interface of FIG. 4 is for setting both the volume of the sound and the magnitude of the vibration of the vibration unit 160, and allows the user to set both the volume and magnitude so that the volume and magnitude are larger as a slider is closer to a right side and are smaller as the slider is closer to a left side.

Further, the information processing apparatus 100 according to the embodiment of the present disclosure may change algorithm of the vibration of the vibration unit 160 in accordance with details of content to be reproduced. For example, in a case where the content to be reproduced is music content, the information processing apparatus 100 may vibrate the vibration unit 160 so as to emphasize rhythm or cause the user to feel a lingering sound. Further, for example, in a case where the content to be reproduced is game content, the information processing apparatus 100 may vibrate the vibration unit 160 in conjunction with music in the game, or may vibrate the vibration unit 160 in conjunction with user operation instead of the music in the game. Further, for example, in a case where the content to be reproduced is movie content, the information processing apparatus 100 may vibrate the vibration unit 160 in conjunction with music in the movie, or may vibrate the vibration unit 160 in conjunction with a sound effect such as a gunshot or explosive sound instead of the music in the movie.

As described above, the information processing apparatus 100 according to the embodiment of the present disclosure can vibrate the vibration unit 160 in accordance with reproduction of the content. However, when vibration of the vibration unit 160 is started, it takes time until the vibration unit 160 actually starts to vibrate (until the user starts to feel the vibration) even if a signal for the vibration is transmitted to the vibration unit 160 so as to match a start timing of output of sound in response to input of the sound with a start timing of the vibration of the vibration unit 160. That is, the sound is output from the output unit 170 first, and the vibration unit 160 starts vibrating with a delay.

Therefore, in a case where the content is reproduced in conjunction with the vibration of the vibration unit 160, the information processing apparatus 100 according to the embodiment of the present disclosure may match the start timing of output of the sound in response to input of the sound with the start timing of the vibration of the vibration unit 160 (the timing at which the user starts to feel the vibration) by reproducing the content with a delay.

Figure 5:
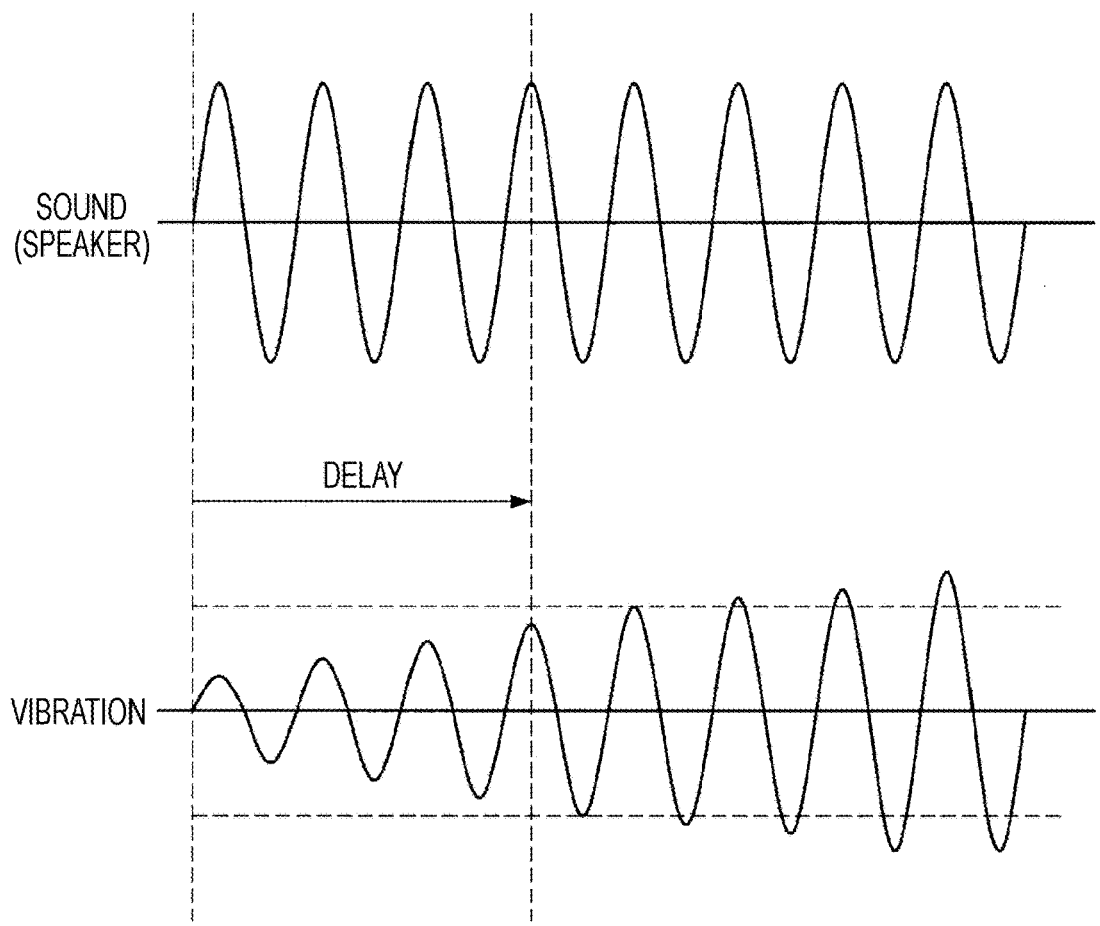
FIG. 5 is an explanatory diagram illustrating an example of output of sound and a change in vibration caused by a vibration unit.

FIG. 5 is an explanatory diagram illustrating an example of output of sound and a change in vibration caused by the vibration unit 160. Vibration of the vibration unit 160 increases with time after the vibration starts, and it takes time until the vibration has a set magnitude. Therefore, the information processing apparatus 100 according to the embodiment of the present disclosure can match the start timing of output of the sound with the start timing of the vibration of the vibration unit 160 (the timing at which the user starts to feel the vibration) by delaying output of the sound as illustrated in FIG. 5.

In a case where output of the sound is delayed, some people may feel that output of the sound is earlier than the start of the vibration, and some people may feel that the start of the vibration is earlier than output of the sound even with the same setting. Therefore, in a case where output of the sound is delayed, the information processing apparatus 100 may have a function of adjusting such time of delay on a setting screen or the like. For example, the information processing apparatus 100 may prepare a plurality of time-of-delay patterns to allow the user to select which time of delay is suitable for the user. When the user selects a time-of-delay pattern, the user can experience output of the sound and output of the vibration that reflect each of the plurality of time-of-delay patterns through operation on the setting screen or the like.

Further, in a case where the sound of the information processing apparatus 100 is output from the wireless speaker 200 of FIG. 1, the sound is further delayed, as compared to a case where the sound is output from the output unit 170 of the information processing apparatus 100, because sound data is transmitted from the information processing apparatus 100 to the wireless speaker 200 via wireless communication. Therefore, in a case where the sound of the information processing apparatus 100 is output from the wireless speaker 200, the information processing apparatus 100 may adjust the time of delay on the basis of device information regarding the wireless speaker 200. Further, in a case where the sound of the information processing apparatus 100 is output from the wireless speaker 200, the information processing apparatus 100 may measure a delay time in advance and determine the time of delay by using the delay time. The delay time may be measured by, for example, recording the sound output from the wireless speaker 200 in the information processing apparatus 100. This makes it possible to compare a timing at which the sound is output from the output unit 170 of the information processing apparatus 100 with a timing at which the sound is output from the wireless speaker 200.

In a case where the content is reproduced in conjunction with the vibration of the vibration unit 160, the user may input characters by using a touchscreen provided as the input unit 130. At this time, the vibration unit 160 may be set to vibrate in response to input of the characters. In this case, the vibration generated from the vibration unit 160 in response to input of the characters and the vibration generated from the vibration unit 160 in conjunction with reproduction of the content are mixed. Thus, those two kinds of vibration cannot be distinguished. In view of this, in a case where the content is reproduced in conjunction with the vibration of the vibration unit 160 and the user operates the touchscreen, the information processing apparatus 100 may temporarily restrict the conjunctive vibration. Then, when the user finishes operation on the touchscreen (for example, in a case where the next touch operation is not performed by the user for one second after the last operation by the user on the touchscreen), the information processing apparatus 100 may start the vibration, which has been restricted, in conjunction with reproduction of the content again. As a matter of course, in a case where the content is reproduced in conjunction with the vibration of the vibration unit 160, the information processing apparatus 100 may not restrict the conjunctive vibration even when the user operates the touchscreen. Whether to restrict the conjunctive vibration even when the user operates the touchscreen may be set by the user on the setting screen or the like. Further, the vibration of the vibration unit 160 in response to input of the characters may be controlled by prioritizing the vibration of the vibration unit 160 performed in conjunction with reproduction of the content.

In addition, for example, the information processing apparatus 100 may not restrict the vibration of the vibration unit 160 in a state in which the information processing apparatus 100 detects that the user holds the own apparatus with his/her hand, and may restrict the vibration of the vibration unit 160 in a state in which the information processing apparatus 100 detects that the user does not hold the own apparatus with his/her hand. Whether or not the user holds the own apparatus with his/her hand may be determined by using sensing data output by the sensor. For example, a touch sensor may be provided on a surface of a housing of the information processing apparatus 100, and the information processing apparatus 100 may determine whether or not the user holds the information processing apparatus 100 by using sensing data output by the touch sensor. Further, whether or not the user holds the own apparatus with his/her hand may be determined on the basis of sensing data output from the acceleration sensor and the gyro sensor.

Hereinabove, the operation example of the information processing apparatus 100 performed in a case where the content is reproduced in conjunction with the vibration of the vibration unit 160 has been described. Next, a processing example of the vibration of the vibration unit 160 depending on a state of the information processing apparatus 100 will be described.

For example, in a case where the vibration unit 160 is set to vibrate without playing a ringtone at the time of an incoming call or email (so-called silent mode or the like), the information processing apparatus 100 may change a vibration strength and vibration pattern of the vibration unit 160 in accordance with a caller/transmitter. For example, in a case where there is an incoming call from a party who is registered in a telephone directory of the information processing apparatus 100, such as a family member or a friend, the information processing apparatus 100 may strongly vibrate the vibration unit 160, or may decrease a frequency of the vibration of the vibration unit 160. Meanwhile, in a case where there is an incoming call from a party who is not registered in the telephone directory of the information processing apparatus 100, the information processing apparatus 100 may weakly vibrate the vibration unit 160, or may increase the frequency of the vibration of the vibration unit 160. Alternatively, in a case where there is an incoming call from a party who is not registered in the telephone directory of the information processing apparatus 100, the vibration of the vibration unit 160 may be restricted, and, in that case, the vibration unit 160 may not be vibrated.

Further, for example, the information processing apparatus 100 may change the vibration pattern of the vibration unit 160 in accordance with the content of a received email. For example, in a case where the content of the received email requires an urgent reply or includes an emotion of anger, the information processing apparatus 100 may strongly vibrate the vibration unit 160, or may decrease the frequency of the vibration of the vibration unit 160. For example, machine learning may be adopted to analyze the email. Further, the email may be analyzed by the information processing apparatus 100, or may be analyzed by a source of the email or a mail server. In such a case, the information processing apparatus 100 may change the vibration pattern of the vibration unit 160 on the basis of information regarding importance that is added to the email by the source of the email or the mail server.

Further, for example, in a case where the user of the information processing apparatus 100 wears the smartwatch 300 of FIG. 1, the information processing apparatus 100 may vibrate the smartwatch 300 in accordance with reproduction of the content. For example, in a case where the information processing apparatus 100 is in the user's bag and the user is listening to the sound of the content with a wired or wireless earphone, no vibration is transmitted to the hand of the user even if the information processing apparatus 100 is vibrated. Therefore, in such a case, the information processing apparatus 100 may transmit a signal for vibrating the smartwatch 300 to the smartwatch 300 in accordance with reproduction of the content. Then, the smartwatch 300 may vibrate a vibrator provided in the smartwatch 300 in response to the signal from the information processing apparatus 100.

Further, in a case where the user of the information processing apparatus 100 wears the smartwatch 300 of FIG. 1 and there is an incoming call or email as described above, a vibration strength and vibration pattern of the smartwatch 300 may be changed in accordance with a caller/transmitter thereof.

Figure 6:
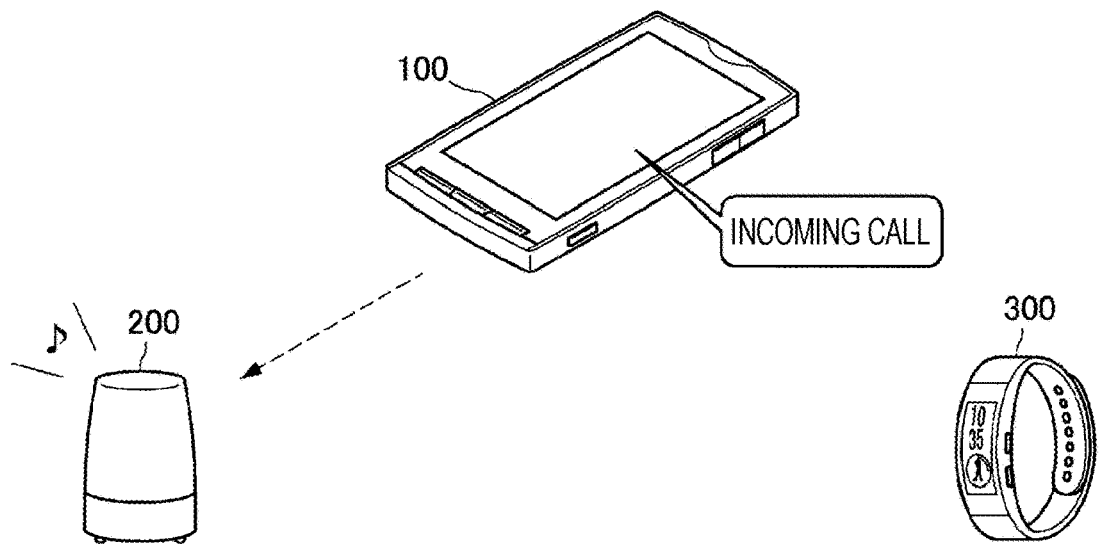
FIG. 6 is an explanatory diagram illustrating a state in which sound of an information processing apparatus is output from a wireless speaker.
Figure 7:
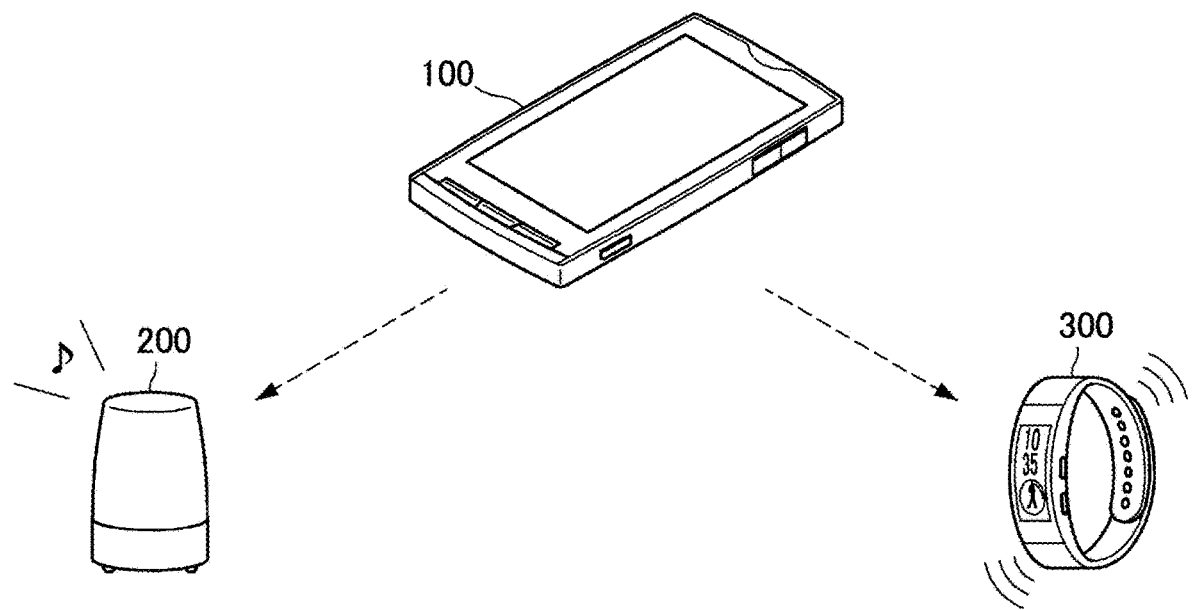
FIG. 7 is an explanatory diagram illustrating a state in which a notification to an information processing apparatus is transferred to a smartwatch while sound from the information processing apparatus is being output from a wireless speaker.

Further, for example, there will be described a case where the sound of the information processing apparatus 100 is output from the wireless speaker 200 of FIG. 1 in a case where the user of the information processing apparatus 100 wears the smartwatch 300 of FIG. 1. FIG. 6 is an explanatory diagram illustrating a state in which the sound of the information processing apparatus 100 is output from the wireless speaker 200 in a case where the user of the information processing apparatus 100 wears the smartwatch 300 of FIG. 1. In such a case, the information processing apparatus 100 may notify the smartwatch 300 that there is an incoming call or email. FIG. 7 is an explanatory diagram illustrating a state in which, in a case where the sound of the content of the information processing apparatus 100 is output from the wireless speaker 200 and the information processing apparatus 100 receives an incoming email or call, the information processing apparatus 100 transmits a signal to the smartwatch 300 to vibrate the smartwatch 300. At this time, for example, the information processing apparatus 100 is set to the silent mode, i.e., the information processing apparatus 100 is set so as not to play a ringtone or notify the wireless speaker 200 of reception of an incoming call or email, and thus no ringtone is reproduced from the wireless speaker 200. This makes it possible to allow the user to recognize an incoming email or call by vibration, without interrupting reproduction of the sound of the content from the wireless speaker 200. Note that the ringtone may be set not to be played. Alternatively, the ringtone may be set to be played while the sound of the content is being played, or may also be set to be played while the sound of the content is being played in a small volume.

In a case where the information processing apparatus 100 captures an image, the information processing apparatus 100 may change the vibration strength and vibration pattern of the vibration unit 160 in accordance with the content of the captured image. For example, in a case where the information processing apparatus 100 finds that a subject person smiles from image analysis, the information processing apparatus 100 may determine that the best shot has been taken and vibrate the vibration unit 160 immediately after the imaging processing to notify the user that the best shot has been taken. Further, for example, when the information processing apparatus 100 analyzes the content of an image displayed on the display unit 140 on the basis of camera through display and determines that a photo opportunity occurs, the information processing apparatus 100 may vibrate the vibration unit 160 to notify the user that a photo opportunity occurs. The photo opportunity is, for example, a state in which a subject person smiles, a state in which many people smile if there is a plurality of subjects, and the like.

In a case where the information processing apparatus 100 executes a map application and displays a map on the display unit 140, the information processing apparatus 100 may change the vibration strength and vibration pattern of the vibration unit 160 by using information regarding a current position acquired by the position information sensor.

For example, in a case where the information processing apparatus 100 executes the map application and displays the map on the display unit 140 and the user is heading in a direction toward a destination, the information processing apparatus 100 may set the vibration of the vibration unit 160 to be comfortable for the user. The vibration that is comfortable for the user may be, for example, vibration with low strength or frequency. Further, in a case where the information processing apparatus 100 executes the map application and displays the map on the display unit 140 and the user is heading in the direction toward the destination, the information processing apparatus 100 may restrict the vibration of the vibration unit 160.

Meanwhile, in a case where the information processing apparatus 100 executes the map application and displays the map on the display unit 140 and the user is not heading in the direction toward the destination, the information processing apparatus 100 may set the vibration of the vibration unit 160 to be uncomfortable for the user. The vibration that is uncomfortable for the user may be, for example, vibration with high strength or frequency. Further, the vibration that is uncomfortable for the user may be vibration in a random pattern. The vibration in a random pattern may mean that the vibration strength changes randomly, a strong vibration interval changes randomly, or the vibration frequency changes randomly.

Further, for example, in a case where the information processing apparatus 100 executes the map application and displays the map on the display unit 140 and the user reaches a corner to turn, the information processing apparatus 100 may vibrate the vibration unit 160 to notify the user that a current place is a corner at which the user should turn.

A so-called "smartphone zombie", which means that a user walks while operating a smartphone, is a social problem. In order to prevent the user from walking while operating a smartphone, in a case where the information processing apparatus 100 detects that the user operates the information processing apparatus 100 while walking on the basis of sensing data, the information processing apparatus 100 may set the vibration of the vibration unit 160 to be uncomfortable for the user as described above. In this case, the information processing apparatus 100 may vibrate the vibration unit 160 so strongly that the user cannot operate the information processing apparatus 100.

2. CONCLUSION

As described above, the embodiment of the present disclosure can provide the information processing apparatus 100 capable of controlling vibration in accordance with a situation in a case where the vibration is generated on the basis of an audio signal.

The steps in the processing executed by each apparatus in this specification do not necessarily need to be processed in a time series in the order described in a sequence diagram or a flowchart. For example, the steps in the processing executed by each apparatus may be processed in order different from the order described in the flowchart, or may be processed in parallel.

Further, it is also possible to create a computer program for causing hardware such as a CPU, a ROM, and a RAM included in each apparatus to exhibit a function equivalent to the configuration of each apparatus described above. Further, it is also possible to provide a storage medium storing the computer program. Further, a series of processing can also be realized by hardware when each functional block illustrated in the functional block diagram is configured by hardware.

Hereinabove, the preferred embodiment of the present disclosure has been described in detail with reference to the accompanying drawings. However, the technical scope of the present disclosure is not limited to such examples. It is obvious that a person having ordinary knowledge in the technical field of the present disclosure can come up with various changes or modifications within the scope of the technical idea described in the claims. As a matter of course, it is understood that those changes and modifications also belong to the technical scope of the present disclosure.

Further, the effects described in this specification are merely illustrative or exemplary and are not limited. In other words, the technology according to the present disclosure can have other effects that are apparent to those skilled in the art from the description of the present specification in addition to or in place of the above effects.

Note that the following configurations also belong to the technical scope of the present disclosure.

(1)

An information processing apparatus including:
a vibration unit; and
a control unit configured to detect a state of the own apparatus and control a state of the vibration unit on the basis of a detection result, in which
the control unit vibrates the vibration unit in accordance with reproduction of content while the content is being reproduced in the own apparatus, and, in a case where a predetermined condition is satisfied, restricts vibration of the vibration unit even while the content is being reproduced in the own apparatus.

(2)

The information processing apparatus according to (1), in which the predetermined condition is a state in which screen display is not performed.

(3)

The information processing apparatus according to (1), in which the predetermined condition is a state in which the content is not reproduced and screen display is not performed.

(4)

The information processing apparatus according to (1), in which the predetermined condition is that operation on a user interface accompanied by the vibration of the vibration unit is performed during reproduction of the content.

(5)

The information processing apparatus according to claim 4), in which the user interface is a user interface for receiving input of characters.

(6)

The information processing apparatus according to (1), further including
a posture detection sensor configured to detect a posture of the own apparatus, in which
the predetermined condition is that the posture detection sensor detects that the own apparatus is placed on a predetermined place.

(7)

The information processing apparatus according to (1), in which the predetermined condition is that contactless power feeding is detected.

(8)

The information processing apparatus according to (7), in which in a case where contactless power feeding is performed, the control unit vibrates the vibration unit to move the own apparatus to a position at which charging is performed with high efficiency.

(9)

The information processing apparatus according to any one of (1) to (8), in which the content is music content.

(10)

The information processing apparatus according to (9), in which the content is music content accompanied by displaying a moving image.

(11)

An information processing method including:
detecting a state of an own apparatus and controlling a state of a vibration unit on the basis of a detection result; and
vibrating the vibration unit in accordance with reproduction of content while the content is being reproduced in the own apparatus, and, in a case where a predetermined condition is satisfied, restricting vibration of the vibration unit even while the content is being reproduced in the own apparatus.

(12)

A computer program for causing a computer to execute:
detecting a state of an own apparatus and controlling a state of a vibration unit on the basis of a detection result; and
vibrating the vibration unit in accordance with reproduction of content while the content is being reproduced in the own apparatus, and, in a case where a predetermined condition is satisfied, restricting vibration of the vibration unit even while the content is being reproduced in the own apparatus.

REFERENCE SIGNS LIST

100 Information processing apparatus
200 Wireless speaker
300 Smartwatch
400 Wireless charger

The invention claimed is:

1. An information processing apparatus comprising:
a vibrator to generate vibrations that are able to be felt by a user; and
a controller configured to
detect a state of the information processing apparatus and control a state of the vibrator based on a detection result of the state of the information processing apparatus,
control the vibrator to vibrate in accordance with reproduction of sound content while the sound content is being reproduced in the information processing apparatus, and, in a case where the detection result of the state of the information processing apparatus satisfies a predetermined condition, restrict vibration of the vibrator even while the sound content is being reproduced in the information processing apparatus, and
control wireless output of signaling to cause another electronic device to vibrate in the case where the detection result of the state of the information processing apparatus satisfies the predetermined condition,
wherein the controller changes the vibration responsive to a display of the information processing apparatus being turned off and based on a file format of the sound content being reproduced and/or a type of the sound content being reproduced, and
wherein the controller changes the vibration responsive to the display of the information processing apparatus being turned off based on machine learning of the type of the sound content being produced.

2. The information processing apparatus according to claim 1, wherein the predetermined condition includes a state that contactless power feeding is detected.

3. The information processing apparatus according to claim 1, wherein the restriction of the vibration of the vibrator occurs during a time in which a user interface receives an input of characters.

4. The information processing apparatus according to claim 1, further comprising:
a posture detection sensor configured to detect a posture of the information processing apparatus, wherein
the predetermined condition is that the posture detection sensor detects that the information processing apparatus is placed on a predetermined place.

5. The information processing apparatus according to claim 1,
wherein the predetermined condition includes a state that contactless power feeding is detected, and
wherein said another electronic device is a wireless mobile electronic device.

6. The information processing apparatus according to claim 5,
wherein in a case where the contactless power feeding is performed, the controller controls vibration of the vibrator to move the information processing apparatus to a position at which charging is performed with improved efficiency relative to a current position of the information processing apparatus,
wherein the information processing apparatus includes a plurality of the vibrators, and
wherein the controller changes a vibration pattern of each of the vibrators to move the information processing apparatus to the position.

7. The information processing apparatus according to claim 1, wherein the sound content is music content.

8. The information processing apparatus according to claim 7, wherein the sound content is the music content accompanied by displaying a moving image prior to the display of the information processing apparatus being turned off.

9. An information processing method comprising:
detecting a state of an information processing apparatus and controlling a state of a vibrator of the information processing apparatus based on a detection result of the state of the information processing apparatus, the vibrator being configured to generate vibrations which are able to be felt by a user;
vibrating the vibrator in accordance with reproduction of sound content while the sound content is being reproduced in the information processing apparatus, and, in a case where the detection result of the state of the information processing apparatus satisfies a predetermined condition, restricting vibration of the vibrator even while the sound content is being reproduced in the information processing apparatus; and
wirelessly outputting signaling to cause another electronic device to vibrate in the case where the detection result of the state of the information processing apparatus satisfies the predetermined condition,
wherein the controller changes the vibration responsive to a display of the information processing apparatus being turned off and based on a file format of the sound content being reproduced and/or a type of the sound content being reproduced, and
wherein the controller changes the vibration responsive to the display of the information processing apparatus being turned off based on machine learning of the type of the sound content being produced.

10. The information processing method according to claim 9, wherein the restriction of the vibration of the vibrator occurs during a time in which a user interface receives an input of one or more characters.

11. The information processing method according to claim 9, wherein the predetermined condition includes a state that contactless power feeding is detected.

12. The information processing method according to claim 11,
wherein the method further comprises, in a case where the contactless power feeding is performed, controlling vibration of the vibrator to move the information processing apparatus to a position at which charging is performed with improved efficiency relative to a current position of the information processing apparatus,
wherein the information processing apparatus includes a plurality of the vibrators, and
wherein the method further comprises changing a vibration pattern of each of the vibrators to move the information processing apparatus to the position.

13. The information processing method according to claim 9,
wherein the sound content is music content, and
wherein the sound content is the music content accompanied by displaying a moving image prior to the display of the information processing apparatus being turned off.

14. A non-transitory computer-readable storage medium having stored thereon instructions that, when executed by one or more processors, causes the one or more processors to perform a method comprising:
detecting a state of an information processing apparatus and controlling a state of a vibrator of the information processing apparatus based on a detection result of the state of the information processing apparatus, the vibrator being configured to generate vibrations which are able to be felt by a user;
vibrating the vibrator in accordance with reproduction of sound content while the sound content is being reproduced in the information processing apparatus, and, in a case where the detection result of the state of the information processing apparatus satisfies a predetermined condition, restricting vibration of the vibrator even while the sound content is being reproduced in the information processing apparatus; and
controlling wireless output of signaling to cause another electronic device to vibrate in the case where the detection result of the state of the information processing apparatus satisfies the predetermined condition,
wherein the controller changes the vibration responsive to a display of the information processing apparatus being turned off and based on a file format of the sound content being reproduced and/or a type of the sound content being reproduced, and
wherein the controller changes the vibration responsive to the display of the information processing apparatus being turned off based on machine learning of the type of the sound content being produced.

15. The non-transitory computer-readable storage medium according to claim 14, wherein the predetermined condition includes a state that contactless power feeding is detected.

16. The non-transitory computer-readable storage medium according to claim 15,
- wherein the method further comprises, in a case where the contactless power feeding is performed, controlling vibration of the vibrator to move the information processing apparatus to a position at which charging is performed with improved efficiency relative to a current position of the information processing apparatus,
- wherein the information processing apparatus includes a plurality of the vibrators, and
- wherein the method further comprises changing a vibration pattern of the vibrators to move the information processing apparatus to the position.

17. The non-transitory computer-readable storage medium according to claim 14, wherein said another electronic device is a wireless mobile electronic device.

\* \* \* \* \*